Oct. 9, 1956     A. H. DALL ET AL     2,766,003
TRACER HEAD MECHANISM

Filed Oct. 5, 1951     2 Sheets-Sheet 1

INVENTOR.
ALBERT H. DALL
HANS FRITSCHI
BY H. H. Parsons & L. W. Wright
ATTORNEYS.

Oct. 9, 1956  A. H. DALL ET AL  2,766,003
TRACER HEAD MECHANISM
Filed Oct. 5, 1951  2 Sheets-Sheet 2
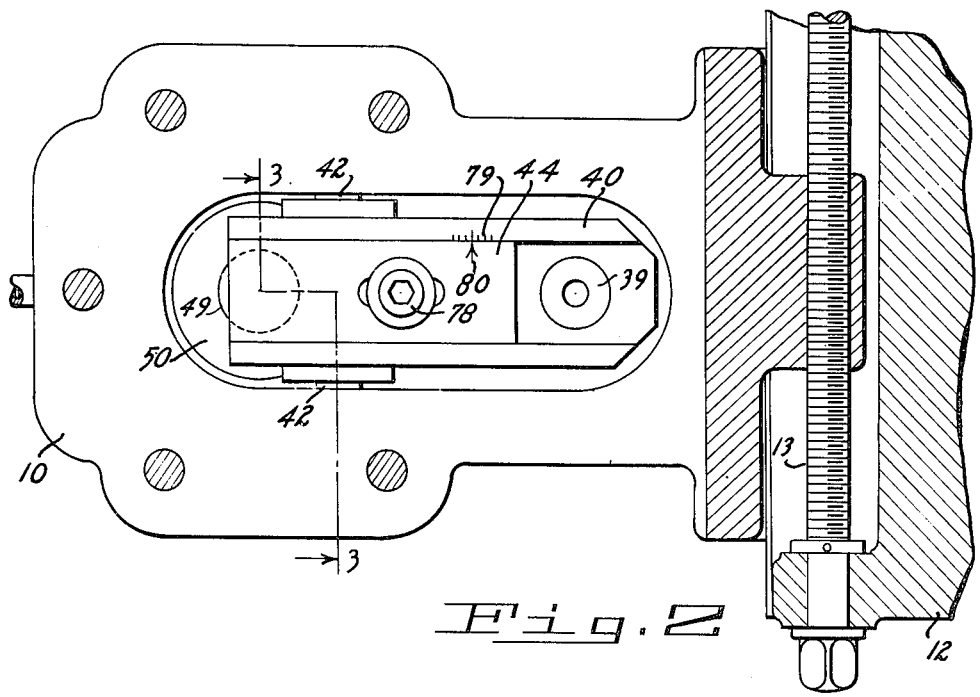
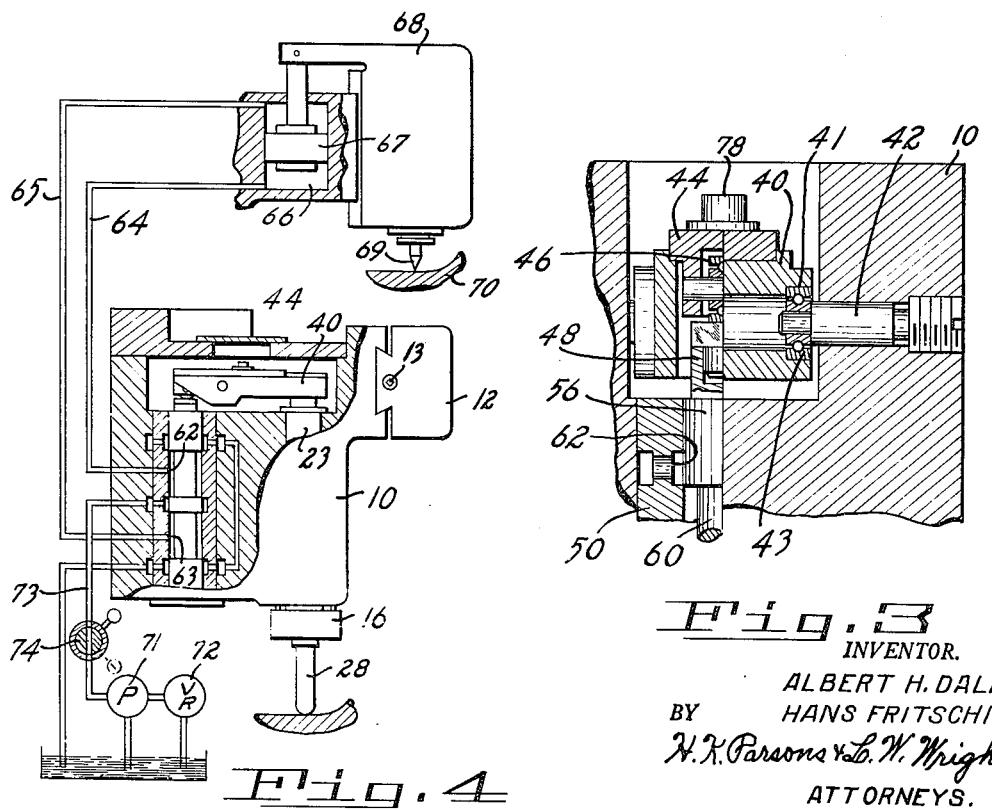
INVENTOR.
ALBERT H. DALL
BY  HANS FRITSCHI
H. K. Parsons & L. W. Wright,
ATTORNEYS.

2,766,003

TRACER HEAD MECHANISM

Albert H. Dall, Cincinnati, and Hans Fritschi, Amberley Village, Ohio, assignors to The Cincinnati Milling Machine Co., Cincinnati, Ohio, a corporation of Ohio Application October 5, 1951, Serial No. 249,845

1 Claim. (Cl. 251—3)

This invention relates to reproducing machine tools and more particularly to improvements in tracer mechanisms for such tools.

One of the objects of this invention is to provide a new and improved tracer mechanism which is so contrived that the moving parts are counterbalanced to the extent that a very light pressure may be obtained between the tracer and pattern, thereby increasing the accuracy of tracing and decrease the wear on the pattern.

Another object of this invention is to effect a separation between the tracer valve and the tracer stem so that they may be connected together in different ratios and thereby vary the degree of movement of the tracer valve with respect to the degree of movement of the tracer stem.

Another object of this invention is to separate the tracer valve from the tracer stem in such a manner that the weight of the tracer valve does not effect the pressure between the tracer stem and the pattern.

A further object of this invention is to facilitate the adjustment of the tracer valve with respect to the maximum or undeflected position of the tracer arm.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

Referring to the drawings in which like reference numerals indicate like parts:

Figure 2 is a section on the line 2—2 of Figure 1.

Figure 3 is a detail section on the line 3—3 of Figure 2.

Figure 4 is a diagram of a hydraulic control circuit which may be controlled by the tracer of this invention.

Figures 1, 5:
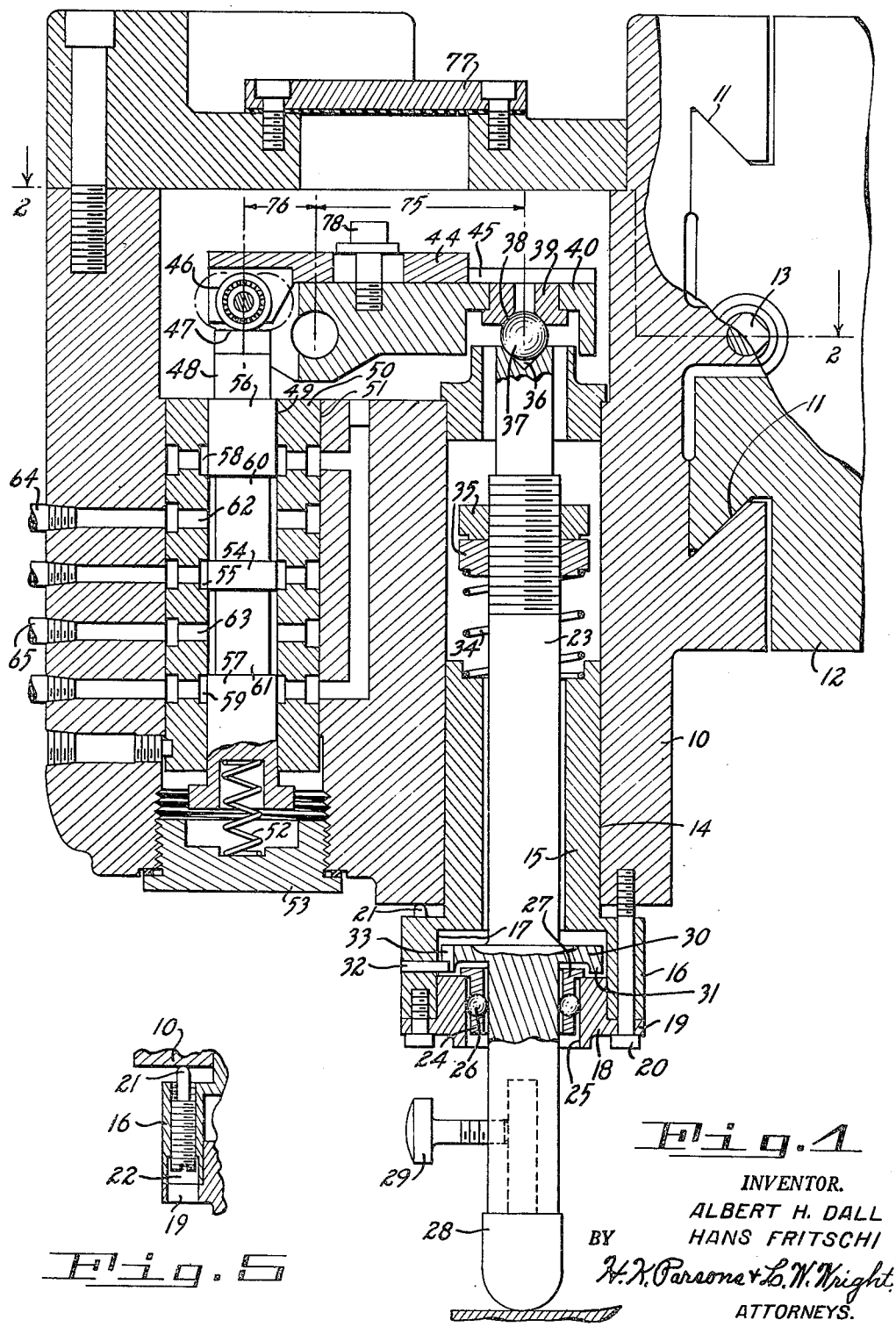
Figure 1 is a sectional elevation of the tracer mechanism embodying the principles of this invention.
Figure 5 is a detail section of the adjustable stop means for positioning the tracer arm.

Referring to the drawings and more particularly to Figure 1, the reference numeral 10 indicates the housing of the tracer mechanism, and this housing may be provided with suitable means such as dovetailed guideways 11 for supporting the housing for adjustment on a machine tool member 12 in suitable relation to a pattern support and tool support. Such adjustment may be effected by a lead screw 13, such as shown in Figures 1 and 2, for changing the spacing between the tracer mechanism and the cutting tool. It is the usual practice to mount the tracer mechanism and the cutter on the same support whereby the movements of the cutter caused to be effected by the tracer arm are fed back to the tracer mechanism.

The housing 10 is provided with a bore 14, as shown in Figure 1, in which is fitted a sleeve 15 for axial adjustment. The projecting end of the sleeve is enlarged at 16 to form a counterbore 17 in which is fitted a closure cap 18 having a flange 19 overlying the end of the sleeve. The cap and sleeve are secured to the housing by a plurality of clamping bolts 20 which are threaded into the bottom of the housing. Adjustable stop means in the form of one or more spacing pins 21 are adjustably threaded in the sleeve as shown in Figure 5 for abutting the underside of the housing to adjust the axial position of the sleeve for purposes to be described hereinafter. A bore 22 is provided in the cap and sleeve to permit insertion of a screwdriver for adjusting the stop pin 21. In other words, by loosening the bolts 20, the stops 21 may be adjusted and then the bolts tightened.

A tracer arm 23 is mounted within the bore of the sleeve with sufficient clearance to permit lateral deflection of the arm. An antifriction bearing member 24 is mounted in the bore 25 of the cap 18, and this member carries an annular series of anti-friction balls 26 interposed between the bore 25 and the circumference of the tracer arm. The bearing member 24 has a flange 27 on the upper side by which it is supported by the cap 18. The anti-friction balls permit free axial movement of the tracer arm and since the balls all lie in one plane, they also permit a certain amount of lateral movement of the tracer arm. The tracer arm may be provided with the usual interchangeable tracer buttons, one of which is indicated by the reference numeral 28 and is secured in the end of the tracer arm by the clamping screw 29.

The tracer arm is provided with a collar button flange 30 which has an annular surface 31 which rests on the top of the member 18 when the tracer is free or undeflected by the pattern, but is held in slightly spaced relation thereto when engaged or deflected by the pattern during operation of the machine, in which position it is shown in Figure 1.

A pin 32 may be provided in the portion 16 of the sleeve and projecting into a slot 33 formed in the flange to prevent rotation of the tracer arm.

A spring 34 is interposed between the end of the sleeve 15 and a pair of lock nuts 35 threaded on the tracer arm to counterbalance the weight of the tracer arm and lighten the pressure of the tracer on the pattern.

The upper end of the tracer arm is provided with a conical socket 36 in which is mounted a ball 37 which engages a seat 38 formed in the underside of an insert 39 fixed in the end of a pivoted rocker arm 40. It will thus be apparent that as the tracer arm is deflected, the ball will be caused to roll in the conical socket and thereby cause movement of the arm 40.

The rocker arm 40 is pivotally mounted in the tracer housing by means shown in Figure 3 in which it is disclosed that the arm 40 has a cross bore 41 in the opposite ends of which are mounted anti-friction bearings 43 which are mounted on the end of pivot pins 42 inserted in aligned bores in the tracer housing. The arm 40 has an adjustable plate 44 mounted in a groove 45 formed on the top side of the arm 40, and this plate carries an anti-friction roller 46 which bears against the top surface 47 of the tracer valve plunger 48. It is to be noted that the roller 46 makes line contact with the end of the tracer valve and that the axis of rotation of the roller is parallel with the axis of pivot of the rocker arm whereby the line of contact is parallel to the pivot axis. This arrangement makes it possible to shift the line of contact relative to the pivot axis to change the length of the lever arm. The tracer valve is slidably mounted in the bore 49 of a valve sleeve 50 fitted in the bore 51 formed in the housing. A spring 52 is interposed between the bottom of the valve plunger and a closure cap 53 which is threaded in the bottom of the housing. It should now be apparent that the spring 52 supports the weight of the valve plunger and that the spring 34 supports the weight of the tracer arm, and both springs hold the tracer arm and the valve plunger against opposite ends of the oscillatable arm 40 and thereby takes out all lost motion between the parts. The tracer valve spring, however, is strong enough to overcome spring 34 and to act through the rocker arm and tracer arm to urge the tracer arm downward to seat the collar button on the end of the cap 18.

The tracer valve 48 has a central spool 54 for closing the pressure port 55 formed in the valve sleeve, and end spools 56 and 57 for closing the exhaust ports 58 and 59 respectively formed in the sleeve. The intervening grooves 60 and 61 between the spools form passages for flow to and from the pressure and exhaust ports and the motor ports 62 and 63. The motor ports may be connected by channels 64 and 65 to opposite ends of an actuating cylinder 66 having a piston 67 which is operatively connected to a tool slide 68 having a cutting tool 69 for operating on a work piece 70. The pressure port may be supplied by a pump 71 having a suitable relief valve 72 and a delivery channel 73 in which may be mounted a start and stop control valve 74.

Attention is invited to the fact that the pivoted rocker arm 40 has two lever arms, one of which is indicated by the reference numeral 75 and extending from the pivot axis of the rocker arm to the axis of the tracer arm. It has a second lever arm 76 which extends from the pivot axis of the rocker arm to the line of contact of the roller 46 with the end of the valve plunger 48. It will be noted that the lever arm 75 is greater than the lever arm 76, thereby producing a mechanical advantage in favor of the tracer arm so that the force applied may be multiplied to effect actuation of the tracer valve. The lever arm 75 is of substantially fixed length whereas the lever arm 76 is variable and may be varied by adjusting the carrier plate 44 along the slot 45 in the rocker arm 40. This adjustment shifts the line of contact of the roller relative to the axis of the tracer valve. By means of this adjustment, the degree of movement of the tracer valve may be varied with respect to the degree of movement of the tracer arm. This arrangement is of value in determining the sensitivity of the valve and the accuracy of the tracing. In other words, for fast rates of tracing as in roughing operations, one setting would be desirable whereas for slow rates of tracing as in finishing operations another setting would be more satisfactory. This lends flexibility to the tracing mechanism in the sense that the tracing action may be adjusted in accordance with the rate of tracing feed and has been found to be a very valuable feature.

Adjustment of the lever arm may be easily and quickly effected by removing the cover plate 77 from the top of the tracer housing, thus providing access to the clamping bolt 78 by which the members 40 and 44 are secured together. It will be noted from Figure 2 that the main arm 40 is provided with a series of graduations 79 indicating the different lever arm ratios that are available, and the member 44 is provided with a pointer mark 80 for registry with the graduation marks. After the adjustments have been made the cover plate is replaced to keep dirt out of the tracing mechanism.

After all of the parts of the tracing mechanism have been assembled and the tracer is free, the tracer valve spring 52 should be adjusted to seat the tracer arm flange 30 against the cap member 19, and this will determine the maximum amount of opening of the portings of the tracer valve. After this has been accomplished, it might be found that the opening of the ports is too little or too much, and that the tracer deflection needed to centralize the spool with respect to the pressure port as it should be in its normal working position is not correct for satisfactory tracing. If adjustment is necessary, this is accomplished by adjustment of the stop pins 21 previously referred to. The clamping bolts 20 are released, and the pins 21 adjusted so that when the parts are resecured together, the valve spool 54 will be in the proper position. This affords an easy and quick adjustment without disturbing the rest of the parts of the mechanism. Further independent adjustment of the portings may be obtained by adjusting the length of the rocker arm.

There has thus been provided an improved tracer mechanism in which the weight of the movable parts actuated by the pattern are counterbalanced to a sufficient degree so that the pressure of the tracer button on the pattern is not influenced by the weight of the parts and almost any degree of light pressure of the tracer on the pattern may be obtained. Also, the ratio adjustment of the rocker arm between the tracer arm and tracer valve may be varied to give different degrees of tracing action in accordance with the rate of tracing feed.

It is also to be noted that the mechanism is so contrived that easy and quick adjustment of the amount of the port openings may be made with respect to the undeflected position of the tracer arm.

What is claimed is:

An accurate response tracer control mechanism for a duplicating machine comprising a housing having a pair of spaced parallel bores formed therein, a tracer controlled valve mounted for axial sliding movement in one of said bores, a tracer arm slidably supported in the other of said bores, means interconnecting said tracer arm and valve for controlling their joint movement comprising a pivot supported by the housing adjacent the valve containing bore, a lever supported by the pivot and projecting into overlying rotation with the tracer arm, said lever having a slide way, a slide mounted in the way above the pivot, said slide having a depending terminal portion projecting beyond the lever into overlying relation with but spaced from the valve, means to secure the slide in longitudinally adjustable position on the lever, a spring urging the valve upward in its bore to position the upper end of the valve substantially into the plane of the axis of the pivot, an abutment for engagement with said end of the valve depending from the terminal portion of the slide having its effective periphery projecting to engage the valve substantially co-planar with the axis of the pivot, the spring reacting through the valve, slide and lever to swing the lever about the pivot toward the tracer arm, means to limit the axial movement of the tracer arm as urged by said spring, and means variably to secure said limiting means to the housing to determine the effective positional setting of the valve in its bore.

References Cited in the file of this patent

UNITED STATES PATENTS

| | | |
|---|---|---|
| 2,078,106 | Temple | Apr. 20, 1937 |
| 2,079,720 | Shaw | May 11, 1937 |
| 2,357,790 | Turchan | Sept. 5, 1944 |
| 2,386,825 | Turchan | Oct. 16, 1945 |
| 2,433,005 | Turchan | Dec. 23, 1947 |
| 2,620,823 | Adams | Dec. 9, 1952 |